Patented Sept. 14, 1937

2,093,265

UNITED STATES PATENT OFFICE 2,093,265

PROCESS FOR THE MANUFACTURE OF DIARYL UREAS

Samuel Coffey and John Edgar Schofield, Huddersfield, England, assignors to Imperial Chemical Industries Limited, a corporation of Great Britain No Drawing. Application March 26, 1932, Serial No. 601,454. In Great Britain March 31, 1931

12 Claims. (Cl. 260—125)

This invention relates to N,N'-diarylureas and a process for the production thereof.

As is well known, some N,N'-diarylureas are not readily obtained when the corresponding arylamines are treated with phosgene according to the general methods hitherto known. Para-nitraniline, for example, does not readily give a carbonyl derivative by these means. Aniline itself, when treated with phosgene, gives only half its equivalent of diphenylurea, the remainder of the aniline being converted into aniline hydrochloride.

It is an object of the present invention to provide a new and improved process for the manufacture of N,N'-diarylureas. A further object is the provision of a process adapted to the production in a technically satisfactory way of N,N'-diarylureas from arylamines insoluble or sparingly soluble in water, or devoid of solubilizing groups. A still further and more specific object is the production of ureas from nitro-amines of the benzene series. Further objects are the production of new chemical compounds and in general to advance the art. Other objects will appear hereinafter.

These objects are accomplished according to the invention whereby N,N'-diarylureas are obtained by treating a primary arylamine with phosgene in the presence of a tertiary base. This is preferably effected by passing gaseous phosgene into the primary arylamine dissolved in or mixed with the tertiary base. A liquid which is indifferent or does not affect the reaction unfavorably may be advantageously employed in an auxiliary capacity as a solvent, diluent, or suspension medium.

The invention will be further illustrated, but is not limited, by the following examples in which the parts are by weight:

Example I

Two hundred seventy-six parts of p-nitraniline, 226 parts of dimethylaniline and 900 parts of toluene are mixed together and 120 parts of phosgene is passed into the stirred mixture, the temperature being kept at 40° C. or below. All of the phosgene being introduced, the mixture is warmed to carry the interaction to completion. It is then cooled and filtered. The solid so obtained is repeatedly extracted with hot water and acidulated with hydrochloric acid, until no more dimethylaniline hydrochloride is removed. The residue (265 parts) is almost pure p,p'-dinitrodiphenylurea.

Example II

Three hundred thirty-six parts of 5-nitro-o-anisidine, 266 parts of di-methylaniline, and 900 parts of toluene are mixed together and treated with 120 parts of phosgene as described in Example I. The product, 5,5'-dinitro-2,2'-dimethoxydiphenylurea, (318 parts) has a melting point of 273–276° C.

Example III

One hundred sixty-eight parts of 5-nitro-o-anisidine, 90 parts of pyridine and 800 parts of toluene are stirred together and 79 parts of phosgene are passed in at about 30° C. The mixture is then warmed to 90° C. and subsequently treated as in Example I. The yield of 5,5'-dinitro-2,2'-dimethoxydiphenylurea is about 87 parts.

Example IV

Two hundred forty-six parts of o-anisidine, 266 parts of dimethylaniline, and 900 parts of toluene are mixed together and treated with 120 parts of phosgene. About 245 parts of di-o-anisylurea of melting point 182–184° C. are obtained.

Example V

One hundred twenty-three parts of o-anisidine, 120 parts of pyridine and 1230 parts of ethylene dichloride are stirred together and 75 parts of phosgene is led in over 3 hours at 15–20° C. The mixture is then heated in one-half hour to 65° C., transferred to a separator, and washed with hot water to remove amine hydrochlorides. The ethylene dichloride solution is separated and the solvent recovered by steam distillation. From the still liquors the solid di-o-anisylurea is filtered and dried.

Example VI

One hundred ninety-eight parts of 4-nitro-2,5-dimethoxyaniline, 135 parts of dimethylaniline, and 500 parts of toluene are mixed together and 60 parts of phosgene are passed into the stirred mixture as described in Example I. The product (208 parts) has a melting point of 276–278° C.

Example VII

Two hundred two and five-tenth parts of 5-chloro-4-nitro-o-anisidine, 135 parts of dimethylaniline and 500 parts of toluene are mixed together and treated with 60 parts of phosgene as described in Example I. The product 5,5'-dichloro-4,4'-dinitro-2,2'-dimethoxyphenyl urea (223 parts) has a melting point of about 274° C.

Example VIII

Thirty parts of 2,3-hydroxynaphthoyl-m-aminoanilide are agitated at room temperature with 80 parts of toluene and 13 parts of dimethylaniline. Phosgene (8 parts) is passed in slowly over one hour, keeping the temperature below 40° C. The mixture is then heated to 90° C. for 4 hours, cooled and filtered, and the precipitate well washed with water and dried. The bis (2,3-hydroxynaphthoyl-m-aminophenyl) urea obtained melts at 275–282° C., and after solution in caustic soda and reprecipitation, at 286–289° C.

Example IX

Two hundred eighty-nine parts of o-phenetidine, 185 parts of pyridine and 800 parts of toluene are mixed together and treated with 126 parts of phosgene at 15–30° C. The mixture is then raised to 90° in one hour, stirred one-half hour, and allowed to cool overnight. The di-o-phenetyl urea is then filtered, washed with dilute acid and water, and dried. The yield is about 243 parts, or 77% of theory.

Example X

Fifty-five parts of 1-m-aminophenyl-3-methyl-5-pyrazolone hydrochloride containing 68.9% by weight of 1-m-amino-phenyl-3-methyl-5-pyrazolone (M. W. 189) are agitated with 260 parts of toluene and 45 parts of dimethyl-aniline and phosgene (12.5 parts) is passed in slowly at 15–30° C. over a period of two hours. The mixture is heated to 90° C. for two hours, cooled and the solid filtered off and washed with water containing hydrochloric acid. The solid is purified by solution in an excess of dilute aqueous sodium carbonate, filtration and reprecipitation with acid. After drying there is obtained about 35 parts of the urea having a melting point of 236–237° C.

In the production of diarylureas in accordance with the present invention, the amine reacted upon with phosgene may be any primary arylamine. The hydrogen atoms in the ring nucleus of the arylamine may or may not be replaced by substituents such as, for example, halogen, nitro, alkyl, alkoxy, substituted amino derivatives (e. g. aryl or alkylacyl-amino), isocyclic and heterocyclic radicals. Mention may be made of the application of the process to the following specific compounds: para-nitraniline, 1-m-aminophenyl-3-methyl-5-pyrazolone, ortho-phenetidine, 2,3-hydroxynaphthoyl-m-aminoanilide, 5-chloro-4-nitro-o-anisidine, 4-nitro-2,5-dimethoxyaniline, ortho-anisidine, 5-nitro-o-anisidine, benzylamine, ortho toluidine, meta-toluidine, alpha and beta naphthylamine and the xylidines.

The tertiary base may be any aliphatic and/or aryl basic tertiary amine. The amount thereof employed should preferably be at least sufficient to take up the hydrogen chloride liberated during the formation of the urea. As examples of tertiary bases may be mentioned dimethyl-aniline, triethanolamine, diethylaniline, diethylamino ethyl alcohol, trimethylene diamine, tripropylamine, methyl diethanol amine, tribenzylamine, nicotine, quinoline, and pyridine.

While it may not be necessary in every case to employ a solvent, suspension agent, or diluent in the reaction, this is generally desirable to render the reaction mixture more fluid, thereby facilitating stirring and increasing the smoothness of the reaction. The kind of solvent or suspension agent employed is subject to considerable variation depending largely upon the nature of the primary and tertiary amines employed. Generally speaking, we prefer to employ organic solvents. Such solvents are particularly advantageous where the amines are not water-soluble. Especially desirable results have been obtained with benzene, toluene, and ethylene dichloride as solvents.

The temperature at which the operation is performed is preferably that of the room, but a higher temperature may be necessary or desirable to accelerate the reaction.

The process represents an advance in the art over prior processes for the production of diaryl ureas. One important advantage is that it can be operated smoothly at low temperatures. Moreover, as previously indicated, it is especially advantageous in the production of ureas from primary arylamines insoluble or sparingly soluble in water, or devoid of solubilizing groups, particularly the nitro arylamines. In connection with the reaction, it should be noted that since the dialkylamines, amongst the tertiary bases which may be employed, interact themselves readily with phosgene (cf., e. g., Helvetica Chimica Acta, 1925, 8,490) it is surprising that they can be employed in the process of our invention.

The products are valuable in the chemical industry, more particularly for the production of dyes. The products described in Examples VI, VII, VIII, and X appear to be novel substances never before prepared.

As many apparent and widely different embodiments of this invention may be made without departing from the spirit thereof, it is to be understood that we do not limit ourselves to the foregoing examples or description except as indicated in the following claims.

In the claims below where products are claimed by formulas, it should be understood that the formula is intended to represent in a general way the composition of the compound claimed, but is not intended to restrict the scope of the claims or to exclude tautomeric or other equivalent forms of the compound where such exist. Also, by the term "negative substituent" we are referring to such substituents which increase the acidity of phenols or decrease the basicity of aniline compounds, as illustrated by the effect of nitro groups and halogen groups.

We claim:

1. Process for the manufacture of symmetrical N,N'-diarylureas comprising the reaction of a primary arylamine with phosgene in the presence of a tertiary base but in the absence of any secondary base.

2. Process as claimed in claim 1 wherein the reaction is carried out in an inert diluent.

3. The process which comprises reacting an amine of the general formula R—NH$_2$, wherein R is a substituted aryl nucleus of the benzene or naphthalene series not containing a substituent which renders the amine substantially water-soluble, with phosgene in the presence of a tertiary base but in the absence of any secondary base.

4. The process which comprises reacting a primary arylamine of the general formula R—NH$_2$, wherein R represents a substituted phenyl nucleus not containing a substituent rendering the amine substantially water-soluble, with phosgene in the presence of a basic tertiary amine but in the absence of any secondary base.

5. The process of producing a symmetrical o,o'-dialkoxy-diaryl urea, which comprises reacting with phosgene upon an o-alkoxy, primary arylamine in the presence of a tertiary base.

6. The process of producing a symmetrical o,o'-dialkoxy-diaryl urea, which comprises passing phosgene gas into an inert organic liquid containing an o-alkoxy, primary arylamine and a tertiary organic base.

7. The process of producing a symmetrical dinitro-diaryl urea, which comprises passing phosgene gas into an inert organic diluent containing a primary nitroarylamine and a tertiary organic base.

8. The process of producing a symmetrical dinitro-diphenyl urea, which comprises reacting with phosgene upon a water-insoluble nitrophenylamine in an inert organic solvent and in the presence of a tertiary organic base.

9. The process of producing a symmetrical p,p'-dinitro-diphenyl urea which comprises reacting a p-nitraniline with phosgene in an inert solvent medium in the presence of a tertiary aryl amine.

10. The process of producing a symmetrical p,p'-dinitro-diphenyl urea which comprises reacting a p-nitraniline selected from the group consisting of p-nitroaniline itself and its nuclear halogen, alkyl and alkoxy derivatives, with phosgene in the presence of a dialkyl aniline.

11. The process of producing a symmetrical p,p'-dinitro-o,o'-dialkoxy-diphenyl urea which comprises reacting a p-nitro-o-alkoxy aniline with phosgene in the presence of dimethyl aniline.

12. The process of producing a symmetrical p,p'-dinitro-diphenyl urea which comprises reacting a p-nitraniline with phosgene in toluene and in the presence of dimethyl aniline.

SAMUEL COFFEY.
JOHN EDGAR SCHOFIELD.